United States Patent [19]

Preston

[11] Patent Number: 5,106,285

[45] Date of Patent: Apr. 21, 1992

[54] AIR AND WATER DELIVERY SYSTEM FOR A SHELL MOLD

[75] Inventor: Frank J. Preston, Hampton, N.H.

[73] Assignee: Davidson Textron Inc., Dover, N.H.

[21] Appl. No.: 678,232

[22] Filed: Apr. 1, 1991

[51] Int. Cl.⁵ .................... B29C 41/18; B29C 41/46
[52] U.S. Cl. .................... 425/144; 137/605; 239/438; 239/443; 264/302; 264/DIG. 60; 425/435; 425/DIG. 246
[58] Field of Search ............. 137/605; 239/128, 135, 239/438, 440, 441, 443, 447; 249/79; 264/40.6, 302, 310, 327, DIG. 60; 425/144, 425, 435, DIG. 110, DIG. 246

[56] References Cited

U.S. PATENT DOCUMENTS

| | | | |
|---|---|---|---|
| 3,728,429 | 4/1973 | Colby et al. | 264/310 |
| 4,621,995 | 11/1986 | Wersosky | 425/144 |
| 4,623,503 | 11/1986 | Anestis et al. | 264/302 |

Primary Examiner—Jay H. Woo
Assistant Examiner—James P. Mackey
Attorney, Agent, or Firm—John P. Moran

[57] ABSTRACT

A delivery system for dispersing either hot air or water uniformly to the outer surface of a shell mold used for forming a thin molded shell, for the respective fusion and cooling phases thereof. The delivery system includes a plurality of distributors, each having a central water inlet surrounded by an axially adjustable outer shell, with the latter having a frusto-conically shaped upper end which cooperates with the upper edge of the central water inlet to selectively close off or vary the annular opening therebetween for controlling the flow of air at a predetermined temperature form the space intermediate the central water inlet and the surrounding outer shell.

8 Claims, 3 Drawing Sheets

AIR AND WATER DELIVERY SYSTEM FOR A SHELL MOLD

TECHNICAL FIELD

This invention relates generally to a mold assembly for molding hollow thin-walled articles from a heat-fusing material such as vinyl plastisol by slush or dry molding and, more particularly, to such a mold assembly wherein hot and cold gas is used to regulate the mold wall temperature.

BACKGROUND

Various vinyl plastisol compositions are known and used in various slush molding methods in various assemblies for performing those methods. Typically, an open hollow mold is filled with liquid plastisol or covered by dry plastisol and heat is applied to the mold surface and transferred to the liquid or dry plastisol to gel a layer of plastisol adjacent the mold surface. The thickness of the gelled layer depends upon the temperature to which the plastisol layer is subjected and the time the plastisol is maintained at that temperature. After the layer adjacent the mold surface is gelled, the ungelled plastisol is dumped or poured out of the mold.

In one well-known method, the mold temperature is maintained relatively low to prevent gelling as a very thin initial layer or coating of plastisol is applied to the mold to prevent bare spots and to prevent the entrapment of air bubbles, thereby providing a thin coating which strictly conforms to the mold configuration. Such a coating is applied by filling and emptying the mold. For example, automotive dashboard or instrument panel covers are made in this fashion and the molds frequently include details to define imitation stitching in the finished product as well as undercuts and other intricate detail. The very thin coating is first applied to conform to the mold and to prevent irregularities in the outer surface of the finished product. After this very thin coating is applied, the mold is again filled with additional plastisol and the entire mold is heated to gel the plastisol and increase the thickness of the finished product. After the desired thickness is attained, the mold is again dumped or emptied and thereafter the mold is subjected to additional heat for curing the product.

An example of such a method and an assembly for practicing same is shown in the U.S. Pat. No. 3,728,429 granted to Daniel E. Colby, Philip E. Rogers and Frederick J. Sliwinski on Apr. 17, 1973 and assigned to the assignee of the subject invention. That patent discloses such a method for slush molding articles wherein the mold is heated by the exterior surfaces thereof being exposed to impinging streams of hot gas and, after the product is finished, the mold is cooled by being subject to cooling water from water spray nozzles, after which the fused finished article is stripped from the mold. In addition, an endless conveyor moves a plurality of molds through various stations in the performance of the method. Although the method and assembly shown in this patent have proven to be very satisfactory, there are disadvantages such as the open flame adjacent the molds, which produces the hot gas for heating of the molds, and the use of water or liquid for cooling the molds and which can be incompatible with the plastisol. Further, the assembly, because of its long conveyor and multiple molds, is suited for long runs of a plastisol of a particular color but is not well suited for short runs or quick or efficient changeovers.

Other methods of heating in a slush molding process have been utilized in the prior art; for example, the molds may be moved through heating ovens as exemplified in the U.S. Pat. No. 3,002,230 granted to J. W. Stewart on Oct. 3, 1961. Alternatively, the molds may be subjected to induction heaters as exemplified in the U.S. Pat. No. 3,315,016 granted to John M. Wersosky and Donald A. Moore on Apr. 18, 1967 and assigned to the assignee of the subject invention. Another method for heating the mold is exemplified in U.S. Pat. No. 3,680,629 granted to Laurent R. Gaudreau and Floyd E. McDowell on Aug. 1, 1972 and assigned to the assignee of the subject invention. That patent teaches the heating of a mold by incorporating tubes in the mold and flowing a heated fluid such as steam through the tubes for heating the mold. It is also known in the slush molding art to heat the mold by such tubes for conveying liquid through the mold wherein there are multiple circuits of the tubes with each circuit having an inlet and an outlet, but with each circuit subjected to the same fluid medium, i.e., the same temperature.

U.S. Pat. No. 4,623,503 granted to Emmanuel Anestis and Frederick I. Wakefield on Nov. 18, 1986, with a common assignee, discloses an assembly controlling the thickness of an article made by the slush molding process or dry plastic casting process in a mold having first and second groups of gas passages defined by gas jet nozzles disposed adjacent the mold surface with dampers for controlling the temperature of respective first and second areas of the mold surface.

U.S. Pat. No. 4,621,995 granted to John M. Wersosky on Nov. 11, 1986, and assigned to the assignee of the subject invention, provides an improved valve assembly with two drive cylinder positioned valve plates for controlling the thickness of an article made by the slush molding process in a mold having first and second impingement jet distribution means and a gas heating and cooling system for controlling the temperature over respective first and second areas of the mold surface. The first group of impingement jet nozzles are disposed adjacent the first area of the mold surface where it is desired to increase the thickness of the finished article whereas the second group of impingement jets is disposed adjacent the second area of the mold surface where the material in the finished article is scrapped and/or will be trimmed and therefore the desired thickness is desirably less. The first and second groups of impingement jet nozzles are supplied with gas by regulating the cylinders to position the valve plates thereby to control the temperature of the first and second areas of the mold surface at a non-gelling temperature as plastisol is disposed over the mold surface to define a coating or layer. This very thin coating of plastisol is applied to be free of surface blemishes. Thereafter, additional plastisol is provided for increasing the thickness only over the first area of the mold surface. To accomplish this, the valve plates are positioned so that hot gas flows through first group of impingement jet nozzles to heat the first area of the mold surface to a higher temperature than the second area so as to gel the plastisol over the first area of the mold surface, while producing thinner thickness in the molded article at a second region which is scrap or trim area of the molded article.

DISCLOSURE OF THE INVENTION

A general object of the invention is to provide an improved heating and cooling system for selectively providing hot or cold air or water, as desired, evenly over the entire area of the outer surface of a shell mold used for casting thermoplastic particles or thermoplastic slurry into a thin molded shell.

Another object of the invention is to provide an air and water delivery apparatus for a shell mold, wherein the apparatus includes a plurality of distributors positioned in a predetermined pattern following the contour of an adjacent mold outer surface, with each distributor having an adjustable air nozzle surrounding a water nozzle.

A further object of the invention is to provide such an air and water delivery apparatus for uniformly heating or cooling the surface of a shell mold, wherein the apparatus includes a plurality of distributors, each having a central water inlet surrounded by an axially adjustable outer shell, with the latter having a frusto-conically shaped upper end which cooperates with the upper edge of the central water inlet to selectively close off or vary the annular opening therebetween for controlling the flow of air at a predetermined temperature from the space intermediate the central water inlet and the surrounding outer shell.

These and other objects and advantages of the invention will become more apparent when reference is made to the following drawings and the accompanying description.

BEST MODE OF CARRYING OUT THE INVENTION

Figure 1:
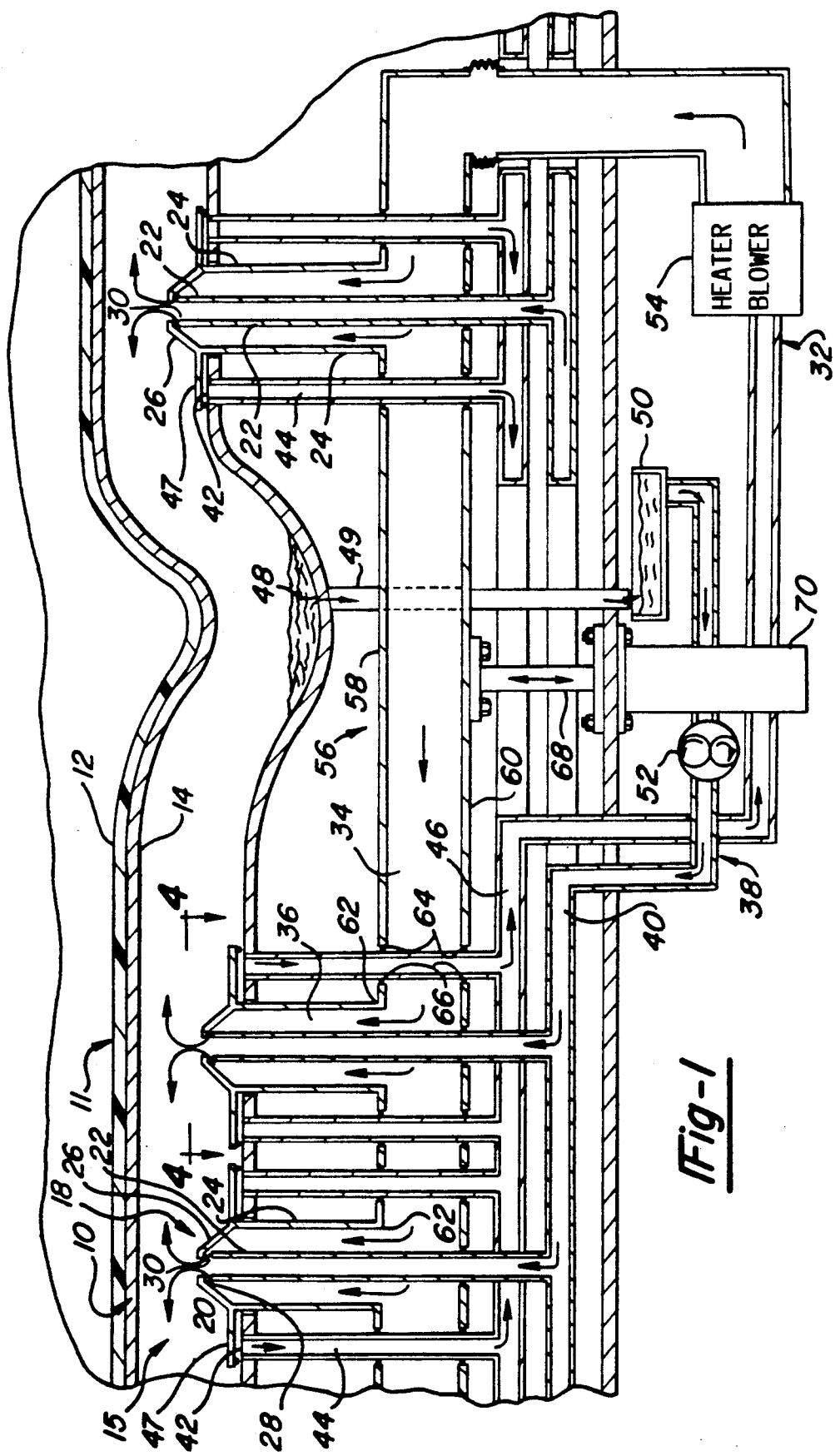
FIG. 1 is a side elevational cross-sectional view of a mold heating and cooling system embodying the invention.

Referring now to the drawings in greater detail, FIG. 1 illustrates a wall portion of a shell mold, represented as 10, used for casting thermoplastic particles or thermoplastic slurry into a thin molded shell, represented as 11. An inner surface 12 and an outer surface 14 define the bottom wall of the mold. An air and water delivery apparatus 15 is shaped along an upper tube sheet 16 portion thereof to follow the contour of the outer surface 14 and is spaced a predetermined distance therefrom. The delivery apparatus 15 serves to deliver hot or cold air and cooling water to the outer surface 14 of the shell mold 10. The apparatus 15 includes a plurality of distributors 18, each including a nozzle 20 having a central water inlet 22 surrounded by an axially adjustable outer shell 24. The latter includes a frusto-conically shaped upper end 26 which cooperates with the upper edge 28 of the central water inlet 22 to selectively close off or vary the annular opening 30 therebetween for a purpose to be described.

Hot air is communicated from a manifold 32 via a common passageway 34 into the annular space 36 intermediate the central water inlet 22 and the surrounding outer shell 24. Water is communicated from a manifold 38 via a common passageway 40 into the central water inlet 22.

Figure 4:
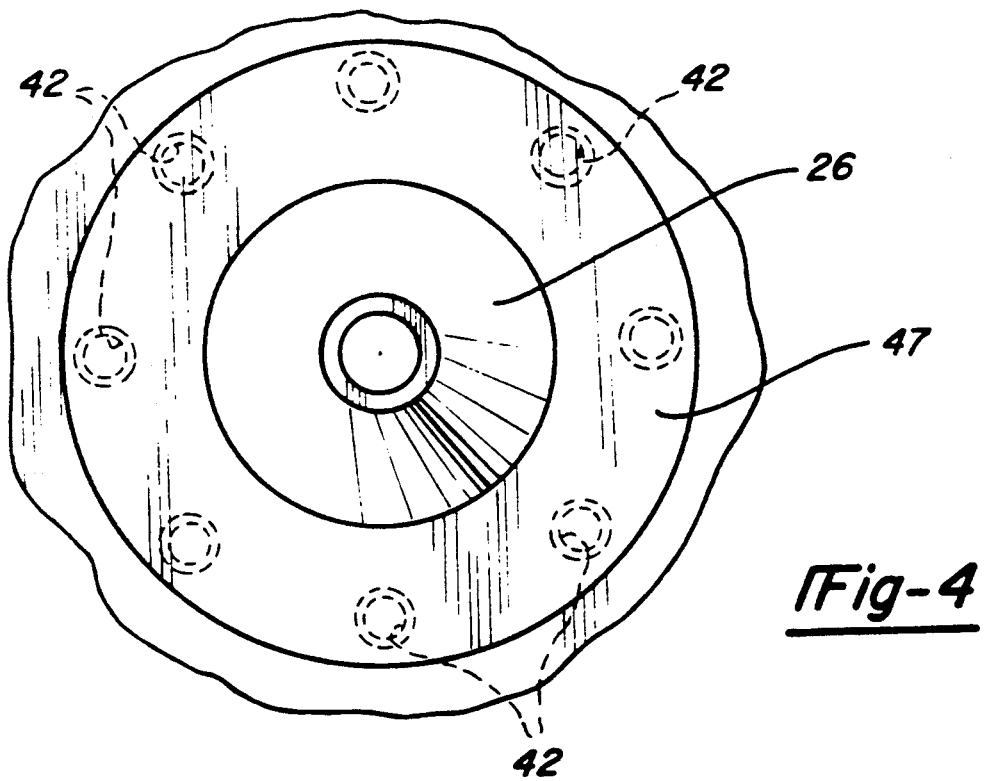
FIG. 4 is an enlarged cross-sectional view taken along the plane of the line 4—4 of FIG. 1, and looking in the direction of the arrows.

A plurality of circumferentially spaced openings 42 (FIG. 4) are mounted around each of said outer shells and communicate with respective air return passageways 44 leading to a common passage 46. The openings 42 may be selectively closed off by any suitable means, such as a sealed collar 47 extending from the outer shell 24 at the juncture of the frusto-conically shaped upper end 26.

A drain 48 is provided at a low point of the tube sheet 16 of the delivery apparatus 15 to return cooling water via a pipe 49 to a reservoir 50. The manifold 38 includes a pump 52 operatively connected in the common passageway 40 which serves to recirculate the water from the reservoir 50 to the central water inlet 22. The manifold 32 includes a suitable heater and blower unit 54 operatively connected in the common passage 46 which serves to heat and recirculate the air from the return passageways 44 to the common passageway 34 and thence to the respective annular spaces 36.

The outer shells 24 may be made adjustable in any suitable manner. One suitable arrangement is shown in FIG. 1 as a structure 56 having upper and lower walls 58 and 60, respectively, wherein the upper wall 58 is connected to the lower ends 62 of the respective outer shells 24. The walls 58 and 60 include openings 64, with suitable seals 66 therein for slidable mounting around the respective water inlets 22 and passageways 44. The structure 56 is adapted to being slidably adjusted upwardly or downwardly by any suitable means, such as a piston 68 of a fixed cylinder 70. The resultant reciprocal action serves to selectively vary the annular opening 30 to provide predetermined hot air flows therethrough to the space between the mold bottom outer surface 14 and tube sheet 16 of the delivery apparatus 15.

OPERATION

In order to control the desired thin coating of plastisol forming the shell 11 free of surface blemishes, over the mold surface, it is necessary to control the heat-up rate and temperature of the mold surface during the operating cycle. The air flow rates, air temperature, and nozzle sizes, once the spacings and distance from the mold outer surface of such nozzles are established, are the main variables which can be adjusted to produce selective heating and cooling of the mold's contoured wall.

Figure 2:
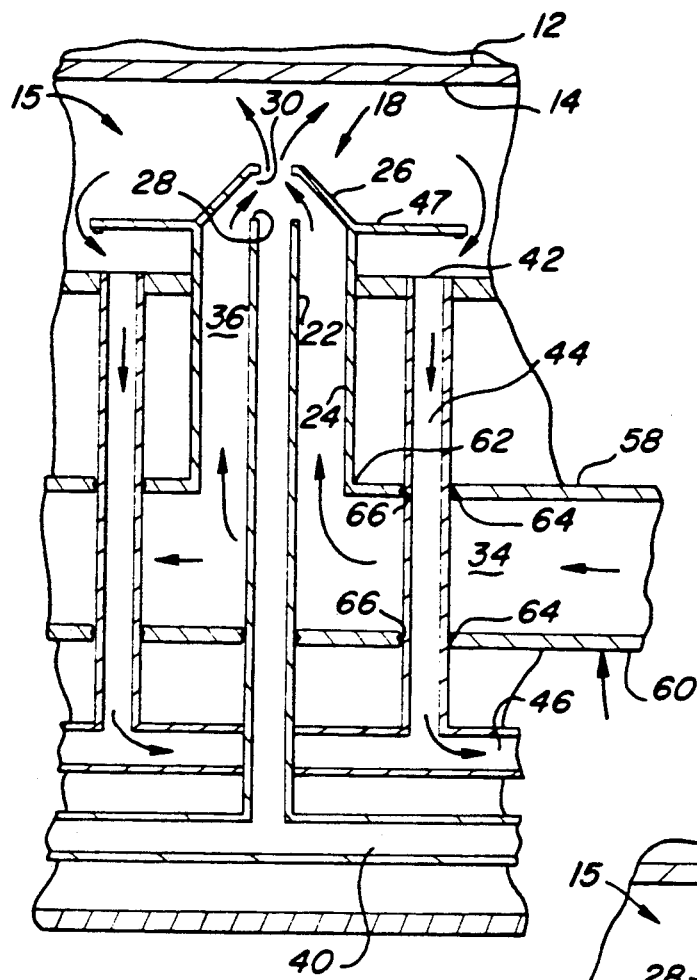
FIGS. 2 and 3 are enlarged fragmentary cross-sectional views of portions of the FIG. 1 structure, illustrating different optional conditions thereof.

During the heating or "fusion" phase, hot air is supplied from the heater and blower unit 54 through the common passage 34 into the respective annular spaces 36, and thence through the annular openings 30, as shown in FIG. 2, to the space adjacent the outer surface 14 of the shell mold 10, to control the thickness and uniformity of the plastisol which has been injected into the shell mold. The air returns through the openings 42, the passageways 44, and the common passage 46 to be brought back up to the desired temperature and recirculated by the heater and blower unit 54.

Figure 3:
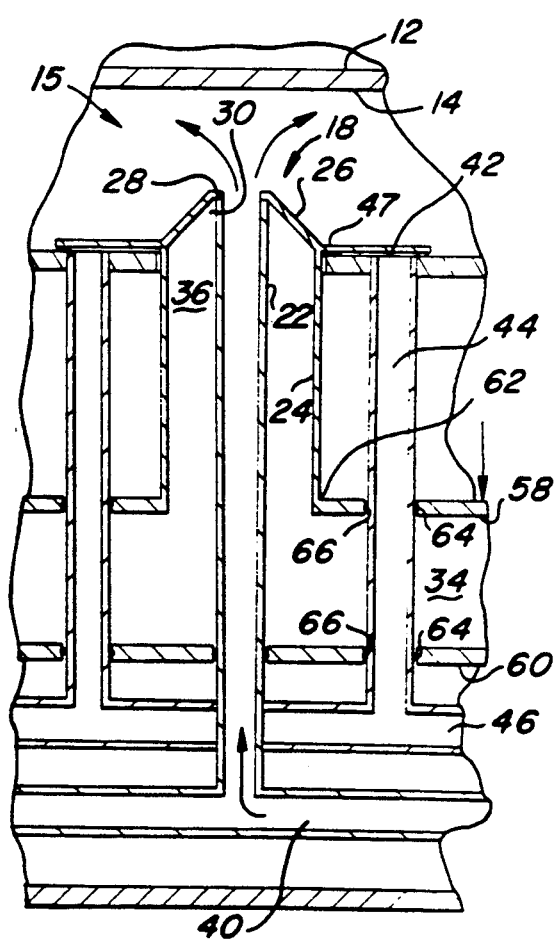

When cooling is called for, the structure represented as 56 is lowered by the actuation of the cylinder 70 and its piston 68, to close of the annular openings 30, as shown in FIG. 3, whereupon the pump 52 is actuated to pump water through the passageway 40 into the central water inlet 22 and, thence, to the space adjacent the entire outer surface 14 of the mold 10. The water returns through the drain 48 to the reservoir 50.

INDUSTRIAL APPLICABILITY

It should be apparent that the invention provides an improved heating and cooling distribution system for a shell mold, wherein the air flow for the fusion phase is variable from full flow to no flow by virtue of an adjustable nozzle, and wherein the cooling phase is accomplished by the flow of water through the center of the nozzle.

While but one embodiment has been shown and described, other modifications are possible within the scope of the following claims.

The embodiments of the invention in which an exclusive property or privilege is claimed are defined as follows:

1. For use with a shell mold having an inner mold surface for molding an article of heat-fusing plastisol material, and an outer surface, a hot air and water delivery apparatus comprising a tube sheet shaped to follow the contour of said outer surface at a predetermined distance therefrom, a plurality of selectively spaced distributors operatively connected to said tube sheet, said distributors each including nozzle means for selectively delivering hot air and water, said nozzle means having a central water inlet having an open distal end, said central water inlet being surrounded by an outer shell having a shaped upper end which provides a predetermined annular space intermediate the outer shell and the central water inlet, and adjusting means operatively connected to said outer shell for axially adjusting said outer shell so as to selectively vary an annular opening intermediate said open distal end and said shaped upper end, and first supply means for supplying air at a predetermined temperature to said respective annular spaces and said variable annular openings to selectively uniformly heat said mold outer surface during a fusion phase, and second supply means for supplying water to and through said central water inlet to uniformly cool said mold outer surface during a cooling phase.

2. The hot air and water delivery apparatus described in claim 1, wherein said shaped upper end is frusto-conically shaped such that an inner surface thereof cooperates with said open distal end to vary said annular opening therebetween upon actuation of said adjusting means, and abuts against said open distal end to close off said annular opening.

3. The hot air and water delivery apparatus described in claim 2, further comprising a plurality of circumferentially spaced air return passageways formed around said outer shell to return the air to said first supply means.

4. The hot air and water delivery apparatus described in claim 1, further comprising a drain formed in said tube sheet for returning the water to said second supply means.

5. The hot air and water delivery apparatus described in claim 3, wherein said first supply means includes a common passage communicating between said air return passageways and said annular space intermediate the outer shell and the central water inlet, and a heater and blower unit operatively mounted in said common passage.

6. The hot air and water delivery apparatus described in claim 4, wherein said second supply means includes a reservoir communicating with said drain, a passageway communicating between said reservoir and said central water inlet, and a pump operatively mounted in said passageway.

7. The hot air and water delivery apparatus described in claim 3, further comprising flange means formed on said outer shell for shutting off said air return passageways when said inner surface of said frusto-conically shaped upper end abuts against said open distal end.

8. The hot air and water delivery apparatus described in claim 1, wherein said adjusting means includes wall means secured to and supporting lower ends of said respective outer shells, and cylinder means for selectively moving said wall means to vary said annular openings.

* * * * *